UNITED STATES PATENT OFFICE.

JOHN H. HETHERINGTON, OF MILWAUKEE, ASSIGNOR, BY MESNE ASSIGNMENTS, TO WILLIAM MEADOWS, OF BURLINGTON, WISCONSIN.

FOOD COMPOUND AND PROCESS OF MAKING SAME.

SPECIFICATION forming part of Letters Patent No. 554,366, dated February 11, 1896.

Application filed April 11, 1894. Serial No. 507,115. (Specimens.)

*To all whom it may concern:*

Be it known that I, JOHN H. HETHERINGTON, of Milwaukee, in the county of Milwaukee and State of Wisconsin, have invented certain new and useful Improvements in Food for Infants and Invalids and Processes of Preparing It; and I do hereby declare that the following is a full, clear, and exact description of the invention, which will enable others skilled in the art to which it pertains to make and use the same.

The object of my invention is to provide in concentrated, convenient, and stable form a nutritive, palatable food for infants and invalids which will be readily soluble and easily absorbed and digested by weak or delicate stomachs.

It consists of a dry granulated mixture of the essential nutritive constituents of meat, milk, and grain and of the process of preparing the same, hereinafter particularly described and pointed out in the claims.

For the production of my improved food, I take meat from which the fat has been removed, some suitable cereal or mixture of cereals, and milk, preferably in about the following proportions: five per cent. of meat, twenty-two per cent. of cereals, and fifty per cent. of milk. To these I add about twenty-two per cent. of malted grain, the action of which during the process of manufacture hereinafter explained renders the nutritive constituents of each more easily absorbed and assimilated by the stomach. I also add a certain quantity of calcium hydroxide, preferably one-half of one per cent., to produce an alkaline reaction, and about the same amount of chloride of sodium.

The meat, grain, and malt are chopped or crushed and macerated in water at a suitable temperature, from about 140° to about 150° Fahrenheit, until the proteids of the meat and the starch of the grain have been sufficiently acted upon by the vegetable ferments contained in the malt, an operation requiring ordinarily from two to three hours. A sufficient quantity of water is employed for maceration to produce a liquid that can be readily strained. The temperature of the mixture is then raised and kept for a short time, ten to thirty minutes, at about 175° Fahrenheit. It is immediately strained and to the strained liquor, while active, milk, calcium hydroxide, and chloride of sodium are added in about the proportions above given. After the milk or the casein which it contains has been sufficiently acted upon by the vegetable ferment of the malt, ordinarily in from one to two hours, the composition is evaporated at a lower temperature, say from 100° to 110° Fahrenheit, *in vacuo* to dryness, and granulated in any suitable manner.

By the term "meat" I intend to designate not only beef, mutton, and the like, but also the flesh of fowls, fish, and of other wild and domestic animals; by the term "malt," any suitable grain which has been subjected to the ordinary malting treatment, and by the term "grain" or "cereals" wheat, rye, barley, rice, oats, and the like.

The granulated product prepared as above explained is put up in sealed or tightly-closed bottles, boxes, or packages, in which it may be kept without deterioration for a great length of time. It is prepared for use by dissolving a comparatively-small quantity in water or any other liquid suitable for the purpose.

I make no claim herein to a food product composed solely of meat and malt and the process of preparing it, as they constitute the subject-matter of another application filed by me April 5, 1894, Serial No. 506,395.

I claim—

1. A dry granulated or powdered food product composed of malt; grain, part of which has been rendered soluble by the malt; meat, proteids of which have been converted into soluble peptones; milk, and a small quantity of a substance having an alkaline reaction such as calcium hydroxide, as and for the purpose described.

2. The process of preparing a dry granulated food, which consists in macerating meat, grain and malt in water at a moderate heat, straining the mixture, adding milk to the strained liquid while it is in an active condition, and finally evaporating the product to dryness and granulating it, substantially as and for the purposes set forth.

3. The process of preparing a dry granulated food, which consists in macerating meat, grain and malt together in water at a moderate heat, straining the mixture, adding milk and a small quantity of calcium hydroxide, and chloride of sodium to the strained liquid while it is in active condition, and finally evaporating the product *in vacuo* to dryness and granulating it, substantially as and for the purposes set forth.

In testimony that I claim the foregoing as my own I affix my signature in presence of two witnesses.

JOHN H. HETHERINGTON.

Witnesses:
    THOMAS CROIL,
    CHAS. L. GOSS.